(No Model.)

J. F. SMITH.
MAIL BAG CATCHER.

No. 308,638. Patented Dec. 2, 1884.

WITNESSES
Jno. E. Wiles,
N. S. Wright.

INVENTOR
John Franklin Smith
By C. C. Leggett
Attorney

UNITED STATES PATENT OFFICE.

JOHN FRANKLIN SMITH, OF MASON, MICHIGAN.

MAIL-BAG CATCHER.

SPECIFICATION forming part of Letters Patent No. 308,638, dated December 2, 1884.

Application filed February 29, 1884. (No model.)

*To all whom it may concern:*

Be it known that I, JOHN F. SMITH, of Mason, county of Ingham, State of Michigan, have invented a new and useful Improvement in Mail-Bag Catchers; and I declare the following to be a full, clear, and exact description of the same, such as will enable others skilled in the art to which it pertains to make and use it, reference being had to the accompanying drawings, which form a part of this specification.

My invention consists in the construction and combination of devices and appliances hereinafter specified, and more particularly pointed out in the claims.

Figure 1:
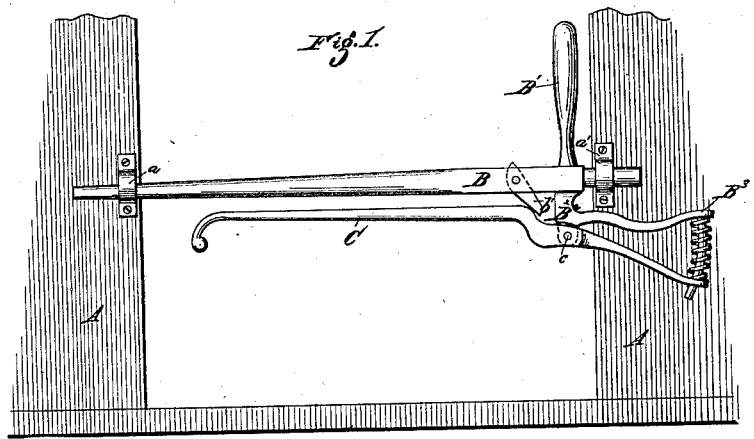
Figure 2:
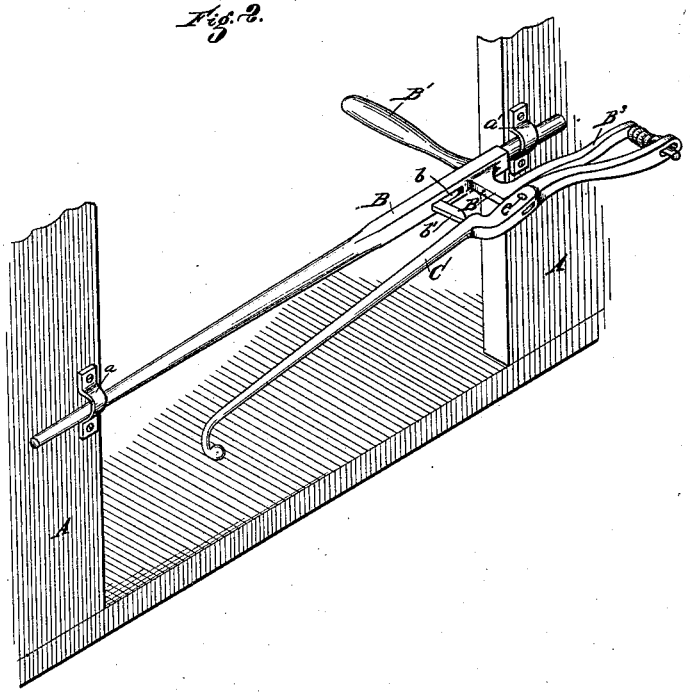

In the drawings, Figure 1 is a side elevation of a device embodying my invention. Fig. 2 is a perspective view of the same ready for operation.

The object of my invention is to provide an improved mail-bag catcher for postal-cars.

I carry out my invention as follows:

In the drawings, A represents the framework of the car, to which the catcher is attached.

$a$ and $a'$ are any suitable brackets attached to said frame-work and adapted to receive the bar B, said bar having a limited rotary motion therein, the construction being such that the bar may be readily removed from the brackets when desired. The bar is provided with a lever-arm, B'.

$b$ is a socket, in which is pivoted a latch, $b'$. I prefer, also, to provide the latch with a suitable spring, though the spring may be omitted without departing from the principle of my invention. The bar B is also provided with a shoulder, $B^2$, and a spring-arm, $B^3$. This spring-arm may be of any suitable construction, preferably as shown, consisting of an angular bar, upon the outer end of which is mounted a coiled spring.

C is the catcher-bar, pivoted to the shoulder of the bar B, as shown at $c$, one end having a bearing against the spring-arm, $B^3$, as shown in the drawings. The end of said catcher-bar has a reciprocating motion upon the outer end of the angular bar, of which the spring-bar, as shown, consists.

The operation of the device is as follows: The catcher-bar is set in position, as shown in Fig. 2 in the drawings, by forcing the open end outward and holding it in position by the latch $b$. Now, when the mail-bag is engaged between the open end of the catcher-bar and the bar B, the force resulting will disengage the latch, and the spring bearing upon the opposite end of the catcher-bar will cause it to grip the bag. The operator, by means of the lever-arm, may then give the device a partial rotation, when the bag may be readily disengaged and secured within the bar.

What I claim is—

1. The combination, with the bar B, provided with a pivoted latch, of a catcher-bar pivotally connected therewith and a spring for closing the catcher-bar when the latch is disengaged, substantially as described.

2. The combination, with the bar B, provided with a latch, a shoulder, and a spring-arm, of a catcher-bar pivoted upon said shoulder, one of its ends being engaged with said spring-arm, substantially as described.

3. The combination, with the bar B, provided with a latch, a shoulder, and an angular arm having a spring upon its outer end, of a catcher-bar pivoted upon said shoulder, one of its ends having a reciprocating motion upon the outer end of said angular bar, substantially as described.

4. The combination, with a mail-car, of a rotary bar removably secured thereto, said bar provided with a lever-arm, a pivoted latch, a shoulder, and a spring-arm, and in connection therewith a catcher-bar pivoted to said shoulder and having a bearing against said spring-arm, substantially as described.

In testimony whereof I sign this specification in the presence of two witnesses.

JOHN FRANKLIN SMITH.

Witnesses:
  THOMAS MCKERNAN,
  W. W. TERWILLIGER.